US010262819B2

(12) United States Patent
Nagatake et al.

(10) Patent No.: US 10,262,819 B2
(45) Date of Patent: Apr. 16, 2019

(54) VACUUM CIRCUIT BREAKER

(71) Applicant: MEIDENSHA CORPORATION, Tokyo (JP)

(72) Inventors: Kazuhiro Nagatake, Numazu (JP); Kaoru Kitakizaki, Saitama (JP); Keita Ishikawa, Tokyo (JP); Shota Hayashi, Tokyo (JP); Kosuke Hasegawa, Numazu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 15/757,108

(22) PCT Filed: Aug. 23, 2016

(86) PCT No.: PCT/JP2016/047730
§ 371 (c)(1),
(2) Date: Mar. 2, 2018

(87) PCT Pub. No.: WO2017/038538
PCT Pub. Date: Mar. 9, 2017

(65) Prior Publication Data
US 2018/0247780 A1    Aug. 30, 2018

(30) Foreign Application Priority Data

Sep. 3, 2015 (JP) ................. 2015-173407

(51) Int. Cl.
*H01H 33/664* (2006.01)
*H01H 33/662* (2006.01)
(Continued)

(52) U.S. Cl.
CPC ............ *H01H 33/664* (2013.01); *C22C 9/00* (2013.01); *C22C 27/04* (2013.01); *H01H 33/662* (2013.01);
(Continued)

(58) Field of Classification Search
CPC .... H01H 33/91; H01H 33/22; H01H 33/7023; H01H 33/74; H01H 1/0015; H01H 1/023;
(Continued)

(56) References Cited

U.S. PATENT DOCUMENTS 5,481,088 A * 1/1996 Peck ..................... C30B 31/10
219/390
5,687,472 A * 11/1997 Honma ................. H01H 33/66
218/136
(Continued)

FOREIGN PATENT DOCUMENTS

JP    S59-119625 A    7/1984
JP    H04-074924 A    3/1992
(Continued)

OTHER PUBLICATIONS

Decision to Grant a Patent drafted on Dec. 7, 2016 in Japanese Application No. 2015-173407.
(Continued)

*Primary Examiner* — Truc Nguyen
(74) *Attorney, Agent, or Firm* — Foley & Lardner LLP

(57) ABSTRACT

Disclosed is a vacuum circuit breaker (1) including a vacuum interrupter (3) accommodated in a ground tank (2) filled with insulating gas. At least one of a fixed electrode (10) and a movable electrode (11) of the vacuum interrupter (3) uses an electrode material in which particles containing a solid solution of a heat resistant element and Cr are finely and uniformly dispersed and in which Cu textures as a high conductive component are finely and uniformly dispersed. The electrode material contains 20 to 70% by weight of Cu, 1.5 to 64% by weight of Cr and 6 to 76% by weight of the heat resistant element relative to a weight of the electrode material. The particles of the solid solution in the electrode material have an average particle size of 20 μm or smaller.

5 Claims, 5 Drawing Sheets

(51) Int. Cl.
*H02B 13/035* (2006.01)
*C22C 9/00* (2006.01)
*C22C 27/04* (2006.01)
*B22F 1/00* (2006.01)
*B22F 3/15* (2006.01)
*B22F 9/04* (2006.01)
*C22C 1/04* (2006.01)

(52) U.S. Cl.
CPC .......... *H02B 13/035* (2013.01); *B22F 1/0011* (2013.01); *B22F 3/15* (2013.01); *B22F 9/04* (2013.01); *B22F 2009/043* (2013.01); *B22F 2201/20* (2013.01); *B22F 2301/20* (2013.01); *B22F 2304/10* (2013.01); *C22C 1/045* (2013.01); *H01H 33/66207* (2013.01); *H01H 2033/66223* (2013.01); *H01H 2201/03* (2013.01)

(58) Field of Classification Search
CPC ............. H01H 1/027; H01H 2033/906; H01H 2033/908; H01H 2037/046; H01H 2205/002; H01H 2239/072; H01H 33/06; H01H 33/16
See application file for complete search history.

(56) References Cited

U.S. PATENT DOCUMENTS

| | | | | |
|---|---|---|---|---|
| 5,697,150 A * | 12/1997 | Komuro | ............... | C22C 1/045 164/94 |
| 5,841,088 A * | 11/1998 | Yamaguchi | ............ | H01H 9/302 218/158 |
| 5,852,266 A * | 12/1998 | Komuro | ............... | C22C 26/00 218/119 |
| 2002/0144977 A1* | 10/2002 | Kikuchi | ............... | H01H 1/0203 218/123 |
| 2008/0194441 A1* | 8/2008 | Kawata | ............ | C09K 19/3804 508/208 |
| 2009/0224864 A1* | 9/2009 | Tetik | ...................... | H01H 71/16 337/372 |
| 2010/0288733 A1 | 11/2010 | Ichikawa et al. | | |
| 2012/0276755 A1* | 11/2012 | Sato | ..................... | C10M 169/02 439/3 |
| 2013/0199905 A1 | 8/2013 | Noda et al. | | |
| 2015/0048054 A1* | 2/2015 | Karkada | ............... | H01H 1/0233 218/146 |
| 2015/0114932 A1* | 4/2015 | Reuber | .............. | H01H 33/6606 218/137 |
| 2015/0170846 A1* | 6/2015 | Nayak | .................... | H01H 1/021 200/265 |
| 2015/0357137 A1* | 12/2015 | Kubo | ..................... | H01H 33/06 218/90 |
| 2016/0369373 A1 | 12/2016 | Kitakizaki et al. | | |
| 2017/0148596 A1* | 5/2017 | Ozaki | .................... | H01H 49/00 |

FOREIGN PATENT DOCUMENTS

| | | |
|---|---|---|
| JP | H11-232971 A | 8/1999 |
| JP | 2007-306701 A | 11/2007 |
| JP | 2012-007203 A | 1/2012 |
| JP | 2014-067512 A | 4/2014 |
| JP | 6075423 B1 | 2/2017 |
| JP | 2017-050191 A | 3/2017 |
| WO | WO-2012/153858 A1 | 11/2012 |
| WO | WO-2015/133264 A1 | 9/2015 |

OTHER PUBLICATIONS

Meiden, "84/72/36k Tank-Type Vacuum Circuit Breaker", Meidensha Catalog, No. GB30-2264D.
Ochiai et al., "Application of Vacuum Switchgear for Power Factor Improvement", Meiden Review, 1979, Series No. 2, vol. 145, p. 59-62.
Office Action drafted on Oct. 12, 2016 in Japanese Application No. 2015-173407.
Takeshita et al., "Development of 120kV 31.5kA Vacuum Circuit Breaker", Proceedings of Heisei 17 Annual Conference of Power and Energy Society, IEEJ, 2005, No. 318, pp. 38-1, 38-2.
Written Amendment filed on Nov. 16, 2016 in Japanese Application No. 2015-173407.
Written Argument filed on Nov. 16, 2016 in Japanese Application No. 2015-173407.

* cited by examiner

Mo:Cr =7:1
MIXED POWDER

Mo:Cr =7:1
SINTERED AT 1250°C FOR 3H (a) ×400

(b) ×800

(a)

× 1000

(b)

× 2000

VACUUM CIRCUIT BREAKER

FIELD OF THE INVENTION

The present invention relates to a vacuum circuit breaker, particularly of the type applicable to phase modifying facilities such as reactor and capacitor bank.

BACKGROUND ART

Vacuum circuit breakers (VCB) enable switching operation with no need for maintenance of breaker parts and thus have an increasing range of applications to railroad facilities and phase modifying facilities where frequent switching is required (see, for example, Patent Document 1 and Non-Patent Documents 1 to 3).

The switching of a capacitor bank causes, at a power-on event, a high-frequency large current about five times as high as a rated current so that roughening of electrode surface occurs by seizing associated with a preceding discharge. At a subsequent interruption event, the capacitor bank receives twice as high a voltage as a system voltage. As the withstand voltage becomes lowered due to the electrode surface roughening, there arises the problem of restriking under such a high voltage. In the case of a vacuum circuit breaker for a capacitor bank, switching operation is performed at a high frequency of about once a day. Such frequent switching operation leads to the problem of accumulation of electrode roughening by an inrush current at power-on. The vacuum circuit breaker for the capacitor bank is hence configured to ensure a high interruption speed or large gap (electrode-to-electrode distance) during interruption in order to improve withstand voltage performance between electrodes of the vacuum circuit breaker.

However, the operation force required for switching of the vacuum circuit breaker is increased as the interruption speed or interruption gap length of the vacuum circuit breaker is increased. This results in upsizing of the operation mechanism for switching of the vacuum circuit breaker.

PRIOR ART DOCUMENTS

Patent Documents

Patent Document 1: Japanese Laid-Open Patent Publication No. 2007-306701

Non-Patent Documents

Non-Patent Document 1: Shojiro OCHIAI and one other, "Application of Vacuum Switchgear for Power Factor Improvement", Meiden Review, 1979, Series No. 2, vol. 145, p. 59-62

Non-Patent Document 2: "Tank-Type Vacuum Circuit Breaker", Meidensha Catalog, No. GB30-2264D Non-Patent Document 3: Yukihiro TAKESHITA and four others, "Development of 120 kV 31.5 kA Vacuum Circuit Breaker", Proceedings of Heisei 17 Annual Conference of Power and Energy Society, IFEJ, 2005, No. 318, pp. 38-1, 38-2

SUMMARY OF THE INVENTION

It is an object of the present invention to provide a technique for contributing to a reduction in the interruption speed or interruption gap length of a vacuum circuit breaker.

To achieve the above object, there is provided according to one aspect of the present invention a vacuum circuit breaker comprising a vacuum interrupter accommodated in a casing filled with insulating gas, the vacuum interrupter comprising: a vacuum container having an insulating tube and seal members for sealing both ends of the insulating tube; and a pair of contacts arranged in the vacuum container so as to be contactable with and separable away from each other, and being fixed to conductive shaft members, wherein at least one of the contacts comprises an electrode material having a Cu phase and a solid solution particle phase containing a solid solution of a heat resistant element selected from Mo, W, Ta, Nb, V and Zr and Cr; wherein the electrode material comprises 20 to 70% by weight of Cu, 1.5 to 64% by weight of Cr and 6 to 76% by weight of the heat resistant element relative to a weight of the electrode material; and wherein particles of the solid solution contained in the electrode material have an average particle size of 20 µm or smaller.

According to another aspect of the present invention, there is provided a vacuum circuit breaker as described above wherein the particles of the solid solution in the electrode material has a dispersion state index of 2.0 or lower.

DESCRIPTION OF THE EMBODIMENTS

A vacuum circuit breaker according to one embodiment of the present invention will be described below with reference to the drawings.

[Structure of Vacuum Circuit Breaker]

Figure 1:
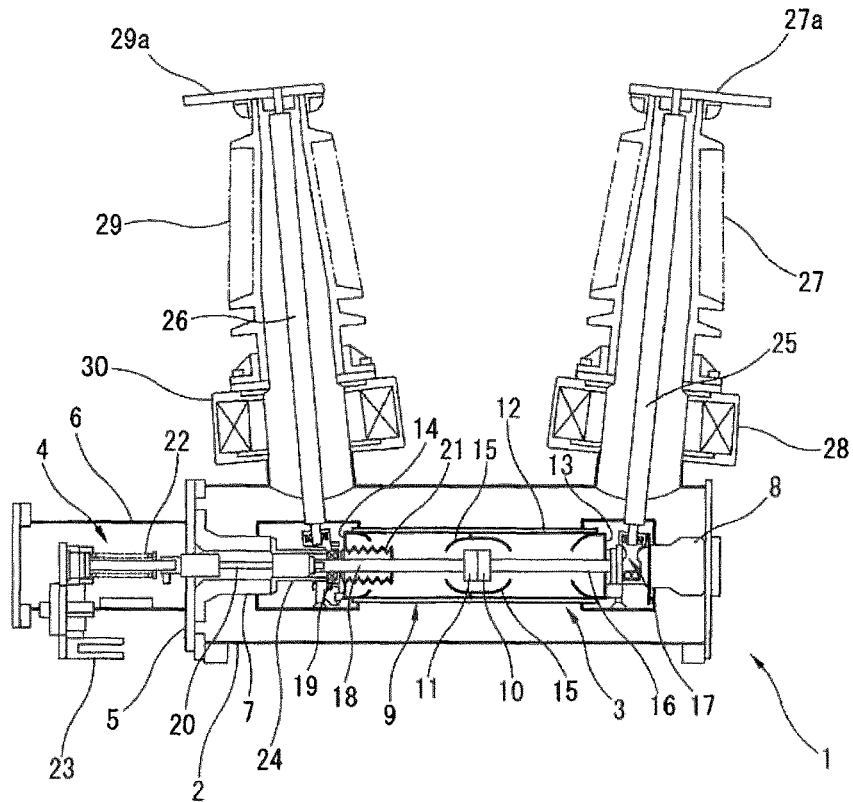
FIG. 1 is a schematic cross-sectional view of a vacuum circuit breaker according to one embodiment of the present invention.

FIG. 1 is a vertical cross-sectional view of a vacuum circuit breaker 1 according to one embodiment of the present invention. The vacuum circuit breaker 1 includes a ground tank 2 (as a casing), a vacuum interrupter 3 accommodated in the ground tank 2, and an operation mechanism 4 for effecting switching operation of the vacuum interrupter 3.

The ground tank 2 is in the form of a cylindrical metallic casing in which the vacuum interrupter 3 is accommodated. The inside of the ground tank 2 is filled with insulating gas such as SF$_6$ gas or dry air. An operation box 6 is attached to one end of the ground tank 2 via a support plate 5. The operation mechanism 4 is arranged in the operation box 5. An insulating support tube 7 is supported on the support plate 5 in one longitudinal inner end portion of the ground tank 2. A support insulator 8 is supported in the other longitudinal inner end portion of the ground tank 2

The vacuum interrupter 3 has a pair of contacts (that is, a fixed electrode 10 and a movable electrode 11) arranged in a vacuum container 9 so as to be contactable with and separable away from each other. The vacuum container 9 consists of an insulating tube 12 and seal members 13 and 14 for sealing both ends of the insulating tube 12. An intermediate shield 15 is disposed in the vacuum container 9 so as to cover the fixed electrode 10 and the movable electrode 11. The fixed electrode 10 is fixed to one end portion of a fixed lead 16 (as a conductive shaft member). The other end portion of the fixed lead 16 protrudes from an end face of the vacuum container 9 and is connected to a fixed-side contact case 17. The movable electrode 11 is fixed to one end portion of a movable lead 18 (as a conductive shaft member). The other end portion of the movable lead 18 protrudes from an end face of the vacuum container 9 and is connected to a movable-side contact case 19. An insulating rod 20 is arranged on the other end portion of the movable lead 18 and connected to the operation mechanism 4. Further, a bellows 21 is arranged on a portion of the movable lead 18 inserted in the vacuum container 9 such that the movable lead 18 can be moved axially in a state that the inside of the vacuum container 9 is maintained under vacuum.

The operation mechanism 4 is connected to the movable lead 18 via the insulating rod 20 so as to allow axial movement of the movable lead 18. A pressure contact spring 22 is provided on the operation mechanism 4 such that, when the fixed electrode 10 and the movable electrode 11 are brought into contact with each other, the pressure contact spring 22 biases the movable lead 18 toward the fixed lead 16 and thereby applies a predetermined contact pressure between the fixed electrode 10 and the movable electrode 11. An operation lever 23 is coupled to the operation mechanism 4. The operation mechanism 4 is thus operated to axially move the movable lead 18 according to movement of the operation lever 23.

The fixed-side contact case 17 is supported on the support insulator 8. A conductor 25 is connected to the fixed-side contact case 17. The movable-side contact case 19 is supported on the insulating support tube 7 via an insulating support 24. A conductor 26 is connected to the movable-side contact case 19.

The conductor 25 is arranged in a state of protruding from the ground tank 2. A bushing 27 is disposed on an outer circumference of the conductor 25 and supported on the ground tank 2. A bushing terminal 27a is provided on an upper end portion of the bushing 27 and brought into electrical conduction with the conductor 25. A bushing current transformer 28 is arranged in a connection part between the bushing 27 and the ground tank 2. Similarly, the conductor 26 is arranged in a state of protruding from the ground tank 2. A bushing 29 is disposed on an outer circumference of the conductor 26 and supported on the ground tank 2. A bushing terminal 29a is provided on an upper end portion of the bushing 29 and brought into electrical conduction with the conductor 26. A bushing current transformer 30 is arranged in a connection part between the bushing 29 and the ground tank 2.

[Production of Fixed Electrode and Movable Electrode]

The vacuum circuit breaker 1 according to one embodiment of the present invention is characterized in that at least one of the fixed electrode 10 and the movable electrode 11 is formed using a high-withstand-voltage electrode material. Herein, an explanation will be given of a method for production of the electrode material of the fixed electrode 10 and the movable electrode 11. The details of the electrode material can be understood by reference to the description of Japanese Patent Application No. 2015-528797. In the explanation of the electrode material, unless otherwise specified, the terms "average particle size", "median diameter d50" and "volume-based relative particle amount" refer to values measured by a laser diffraction particle size distribution analyzer (available from CILAS under the trade name of CILAS 1090L).

Before addressing the present invention, the present inventors have studied the relationship between the occurrence of restriking and the distributions of a heat resistant element (such as Mo and Cr) and Cu and found that, on the surface of the electrode where restriking occurred, there are a large number of minute projections (for example, minute projections of several ten micrometers to several hundred micrometers) observed in a Cu region of lower melting point than heat resistant element. These projections become a factor of deterioration in current interruption performance and withstand voltage performance because of the development of a high electric field at tips of the projections. It is assumed that the projections are generated as portions of the electrodes seized by an inrush current and peeled from each other at a subsequent interruption event. Based on this assumption, the present inventors have made studies on the current interruption performance and withstand voltage performance of the electrode material and consequently found that it is possible to prevent the generation of minute projections in the Cu region and thereby lower the probability of occurrence of restriking by micronizing and finely dispersing the heat resistant element in the electrode and by finely uniformly dispersing the Cu region in the electrode surface. Furthermore, it is considered that the electrode contact causes an electrical breakdown as particles of the heat resistant element on the electrode surface are crushed to fine particles and removed from the electrode surface during repeated switching operations. Based on this consideration, the present inventors have made further studies on the electrode material with high withstand voltage performance and consequently found that it is possible to effectively suppress crushing of the particles of the heat resistant element by decreasing the size of the particles of the heat resistant element in the electrode, finely dispersing the particles of the heat resistant element and finely uniformly dispersing the Cu region in the electrode surface. As a result of extensive researches made on the particle size of heat resistant element, the dispersibility of Cu, the withstand voltage performance of the electrode of the vacuum interrupter and the like in view of the above findings, the present inventors have established the present invention.

In the electrode material for the vacuum circuit breaker according to the embodiment of the present invention, Cr-containing particles are finely micronized and uniformly dispersed; and Cu textures as a highly conductive component are finely and uniformly dispersed.

As the heat resistant element, the electrode material contains one element alone or, two or more elements in combination, selected from molybdenum (Mo), tungsten (W), tantalum (Ta), niobium (Nb), vanadium (V), zirconium (Zr), beryllium (Be), hafnium (HO), iridium (Ir), platinum (Pt), titanium (Ti), silicon (Si), rhodium (Rh), ruthenium (Ru) and the like. It is particularly preferable to use Mo, W, Ta, Nb, V and Zr, each of which is remarkably effective for micronization of the Cr-containing particles. In the case of using the heat resistant element in the form of a powder, the powder of the heat resistant element preferably has an average particle size of 2 to 20 μm, more preferably 2 to 10 μm. In this particle size range, the electrode material attains a composition where the Cr-containing particles (including particles containing a solid solution of the heat resistant element and Cr) are finely micronized and uniformly dispersed. The heat resistant element is preferably contained in an amount of 6 to 76 wt %, more preferably 32 to 68 wt %, relative to the electrode material. With such a heat resistant element content, the electrode material obtains an improvement in withstand voltage performance and current interruption performance without impairment of mechanical strength and workability.

Preferably, Cr is contained in an amount of 1.5 to 64 wt %, more preferably 4 to 15 wt %, relative to the electrode material. With such a Cr content, the electrode material obtains an improvement in withstand voltage performance and current interruption performance without impairment of mechanical strength and workability. In the case of using Cr in the form of particles, the Cr particles preferably has a particle size of −48 mesh (that is, a particle size of smaller than 300 μm), more preferably a particle size of −100 mesh (that is, a particle size of smaller 150 μm), still more preferably a particle size of −325 mesh (that is, a particle size of smaller than 45 μm). In this particle size range, the electrode material achieves high withstand voltage performance and current interruption performance. When the particle size of the Cr particles is set to −100 mesh, it is feasible to reduce the amount of remaining Cr that can be a cause of increasing the particle size of Cu infiltrated in the electrode material. It is preferable that the particle size of the Cr particles is small for dispersion of the micronized Cr-containing particles in the electrode material. However, the smaller the particle size of the Cr particles, the higher the oxygen content of the electrode material. This leads to a deterioration in current interruption performance. It is assumed that the oxygen content of the electrode material is increased with decrease in the particle size of the Cr particles due to oxidation of Cr during micronization of the Cr particles. In the case where Cr is processed into fine particles under the condition that does not cause oxidation of Cr, for example, in an atmosphere of inert gas, the Cr particles, even of smaller than −325 mesh size, can be used. As mentioned above, it is preferable that the particle size of the Cr particles is small for dispersion of the micronized Cr-containing particles in the electrode material.

Further, Cu is preferably contained in an amount of 20 to 70 wt %, more preferably 25 to 60 wt % relative to the electrode material. With such a Cu content, the electrode material obtains a reduction in contact resistance without impairment of withstand voltage performance and current interruption performance. Herein, the Cu content of the electrode material is determined by the after-mentioned Cu infiltration step so that the total amount of the heat resistant element, Cr and Cu in the electrode material do not exceed 100 wt %.

The production method of the electrode material will be explained in detail below with reference to a flowchart of FIG. 2. The following explanation is given by taking Mo as an example of the heat resistant element. It should be however understood that the same applies to the case of using the other heat resistant element.

In the mixing step S1, a heat resistant element powder (for example, a Mo powder) and a Cr powder are mixed. There is no particular limitation on the average particle size of the Mo powder and the average particle size of the Cr powder. It is preferable that the average particle size of the Mo powder is 2 to 20 μM; and the average particle size of the Cr powder is −100 mesh. By such particle size control, the electrode material attains a composition where a solid solution of Mo and Cr is uniformly dispersed in a Cu phase. It is further preferable to mix the Mo powder and the Cr powder in a range that the weight ratio of Cr relative to Mo is 4 or less, more preferably ⅓ or less. It is possible in this weight ratio range to produce the electrode material with high withstand voltage performance and current interruption performance.

In the provisional sintering step S2, provided is a container that does not react with Mo and Cr (such as, for example, an alumina container). The mixed powder obtained by mixing the Mo powder and the Cr powder in the mixing step S1 (hereinafter simply referred to as "mixed powder") is put into the container and subjected to provisional sintering at a predetermined temperature (for example, 250 to 1500° C.) in a non-oxidizing atmosphere (such as hydrogen atmosphere or vacuum atmosphere). By the provisional sintering, there is formed a MoCr solid solution where Mo and Cr are mutually dissolved and diffused in each other. In the calculation step S2, the provisional sintering is not necessarily performed until all of Mo and Cr are formed into the solid solution. However, the use of a provisional sintered body in which either one or both of X-ray diffraction (XRD) peaks assigned to Mo and Cr elements have completely disappeared (that is, a provisional sintered body in which either one of Mo and Cr has been completely dissolved in the other element) contributes to higher withstand voltage performance of the electrode material. Thus, in the case of the Mo powder being mixed in a large amount, the sintering temperature and time of the provisional sintering step S2 are set such that at least Cr element peak disappears in X-ray diffraction measurement of the MoCr solid solution. In the case of the Cr powder being mixed in a large amount, the sintering temperature and time of the provisional sintering step S2 are set such that at least Mo element peak disappears in X-ray diffraction measurement of the MoCr solid solution.

In the provisional sintering step S2, the mixed powder may be subjected to press forming (press treatment) before the provisional sintering. By the press forming, the mutual diffusion of Mo and Cr can be accelerated so as to shorten the provisional sintering time and to decrease the provisional sintering temperature. There is no particular limitation on the pressure applied for the press forming. The press forming pressure is preferably 0.1 t/cm2 or lower. If the press forming pressure of the mixed powder is very high, the provisional sintered body may become hard and thereby difficult to pulverize in the subsequent pulverization step S3.

In the pulverization step S3, the MoCr solid solution is pulverized by a pulverizer (such as planetary ball mill). There is thus obtained a powder of the MoCr solid solution (hereinafter also referred to as "MoCr powder"). Although the pulverization is preferably performed in a non-oxidizing atmosphere in the pulverization step S3, the pulverization may be performed in the air. The pulverization conditions are selected so as to allow pulverization of the particles (secondary particles) where the MoCr solid solution particles are bonded to each other. The longer the pulverization time, the smaller the average particle size of the particles of the MoCr solid solution. It is thus possible, by selecting the pulverization conditions that the volume-based relative particle amount of particles of 30 μm or smaller size (preferably, particles of 20 μm or smaller size) in the MoCr powder becomes 50% or more, to obtain the electrode material in which MoCr particles (i.e. particles formed by mutual dissolution and diffusion of Mo and Cr) and Cu textures are uniformly dispersed.

In the molding step S4, the MoCr powder is subjected to molding. For example, it is feasible to mold the MoCr powder by press molding with a pressure of 2 t/cm².

In the main sintering step S5, the molded body of the MoCr powder is subjected to main sintering. There is thus obtained a MoCr sintered body (MoCr skeleton). For example, it is feasible to subject the molded body of the MoCr powder to main sintering at 1150° C. for 2 hours in a vacuum atmosphere. The main sintering step S5 is a step of forming a denser MoCr sintered body by deformation and bonding of the MoCr particles. The main sintering of the MoCr powder is preferably performed at a temperature higher than or equal to the temperature condition of the subsequent Cu infiltration step S6. For example, the sintering temperature is set to 1150° C. or higher. This is because, when the main sintering is performed at a temperature lower than the infiltration temperature, gas contained in the MoCr sintered body is newly generated during the Cu infiltration and left in the resulting Cu-infiltrated body. The presence of such gas becomes a cause of deterioration in withstand voltage performance and current interruption performance. The sintering temperature is hence set higher than or equal to the Cu infiltration temperature and lower than or equal to the melting point of Cr. The sintering temperature of the main sintering step is preferably in a range of 1150 to 1500° C. In this temperature range, it is possible to densify the MoCr particles and allow sufficient degasification of the MoCr particles.

In the main sintering step S5, the MoCr sintered body may be subjected to HIP (hot isostatic pressing) treatment after the main sintering. For example, it is feasible to perform the HIP treatment by placing the MoCr sintered body in a cylindrical stainless steel container (with a cylindrical inner height of 11 mm, an inner diameter ϕ of 62 mm and a thickness of 5 mm) and, after vacuum-sealing the container, subjecting the sintered body to HIP treatment in a HIP treatment device under the conditions of 1050° C., 70 MPa (0.714 ton/cm²) and 2 hours.

In the Cu infiltration step S6, the MoCr sintered body is infiltrated with Cu. For example, it is feasible to infiltrate the MoCr sintered body with Cu by placing a Cu plate material on the MoCr sintered body and holding them in a non-oxidizing atmosphere at a temperature of higher than or equal to the melting point of Cu for a predetermined time (for example, at 1150° C. for 2 hours).

[Example 1]

Figure 2:
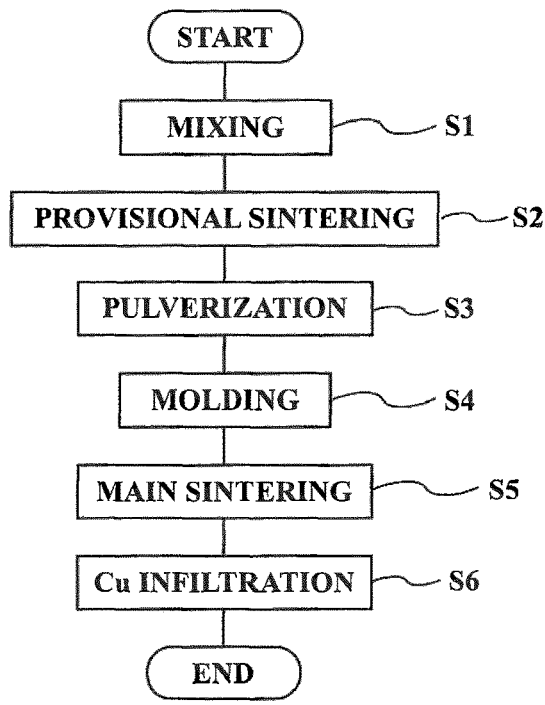
FIG. 2 is a flowchart of a method for producing an electrode material according to one embodiment of the present invention.

An electrode material of Example 1 was produced according to the flowchart of FIG. 2. In Example 1, used was a Mo powder having a particle size of 2.8 to 3.7 μm. The particle size distribution of the Mo powder was measured with a laser diffraction particle size distribution analyzer. By the measurement, the median diameter d50 of the Mo powder was found to be 5.1 μm (d10=3.1 μm, d90=8.8 μm). Further, there was used a Cr powder having a particle size of −325 mesh (mesh opening: 45 μm).

The Mo powder and the Cr powder were weighed at a weight ratio of Mo:Cr=7:1 and mixed sufficiently and uniformly by a V-type mixer.

After the completion of the mixing, the mixed powder of the Mo powder and the Cr powder was put into an alumina container and then subjected to provisional sintering at 1250° C. for 3 hours in a vacuum furnace. The vacuum degree of the vacuum furnace after the provisional sintering at 1250° C. for 3 hours was 3.5×10⁻³ Pa. When the vacuum degree of the vacuum furnace after maintaining the powder at a provisional sintering temperature for a predetermined time is 5×10⁻³ Pa or lower, the electrode material produced from such a provisional sintered body has a low oxygen content and does not impair current interruption performance.

After cooling, the MoCr provisional sintered body was taken out of the vacuum furnace and pulverized by a planetary ball mill for 10 minutes. By X-ray diffraction (XRD) measurement of the thus-obtained MoCr powder, it was confirmed that mutual solid-phase diffusion of Mo and Cr elements was developed by the provisional sintering to form a solid solution of Mo and Cr. More specifically, the crystal constant a of the MoCr powder (Mo:Cr=7:1) was found to be 0.3107 nm by X-ray diffraction (XRD) measurement of the MoCr powder. In the X ray diffraction (XRD) measurement result of the MoCr powder (Mo:Cr=7:1), both of 0.3151 nm peak corresponding to the lattice constant α of the Mo powder and 0.2890 nm peak corresponding to the lattice constant α of the Cr powder had disappeared. It has been shown by this measurement result that Mo and Cr elements were dissolved through mutual solid-phase diffusion by the provisional sintering.

Figure 3:
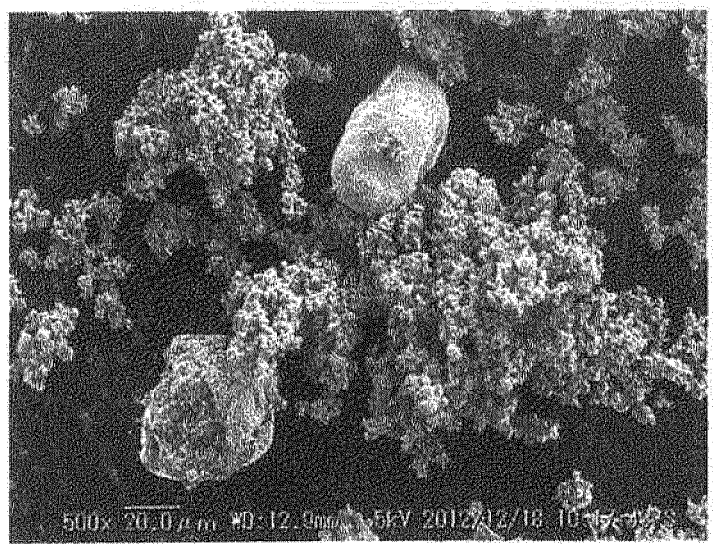
FIG. 3(a) is an electron micrograph of a mixed powder of Mo powder and Cr powder.
FIG. 3(b) is an electron micrograph of a MoCr powder.
Figure 3:
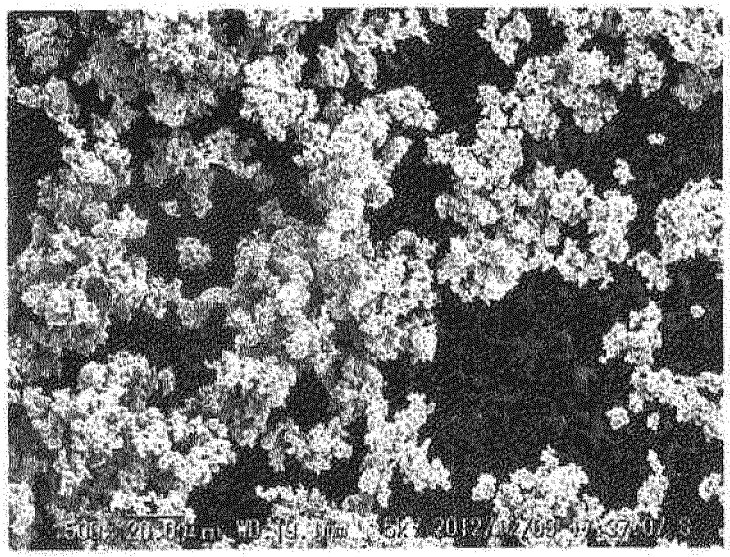

FIG. 3(a) is an electron micrograph of the mixed powder of the Mo powder and the Cr powder. Herein, relatively large particles of about 45 μm size seen in the lower left and upper middle parts of the electron micrograph are Cr particles; and flocculated fine particles seen in the electron micrograph are Mo particles.

FIG. 3(b) is an electron micrograph of the MoCr powder. In the electron micrograph, relatively large particles of about 45 μm size are not seen. It has thus been confirmed that Cr did not exist in the as-is state of raw material (in terms of size). The average particle size (median diameter d50) of the MoCr powder was 15.1 μm.

It is considered from the X-ray diffraction measurement result and from the electron micrographs that, by mixing the Mo powder and the Cr powder and sintering the mixed powder at 1250° C. for 3 hours, Cr was micronized whereby the solid solution of Mo and Cr was formed through mutual diffusion of Mo and Cr.

The MoCr powder obtained in the pulverization step was subjected to press molding with a pressure of 2 t/cm² by a press machine. The resulting molded body was subjected to main sintering at 1150° C. for 2 hours in a vacuum atmosphere, thereby yielding a MoCr sintered body.

Subsequently, a Cu plate material was placed on the MoCr sintered body and kept at 1150° C. for 2 hours in a vacuum furnace so as to infiltrate the MoCr sintered body with Cu. The thus-infiltrated body was adopted as the electrode material of Example 1.

[Cross-Sectional Observation of Electrode Material]

Figure 4:
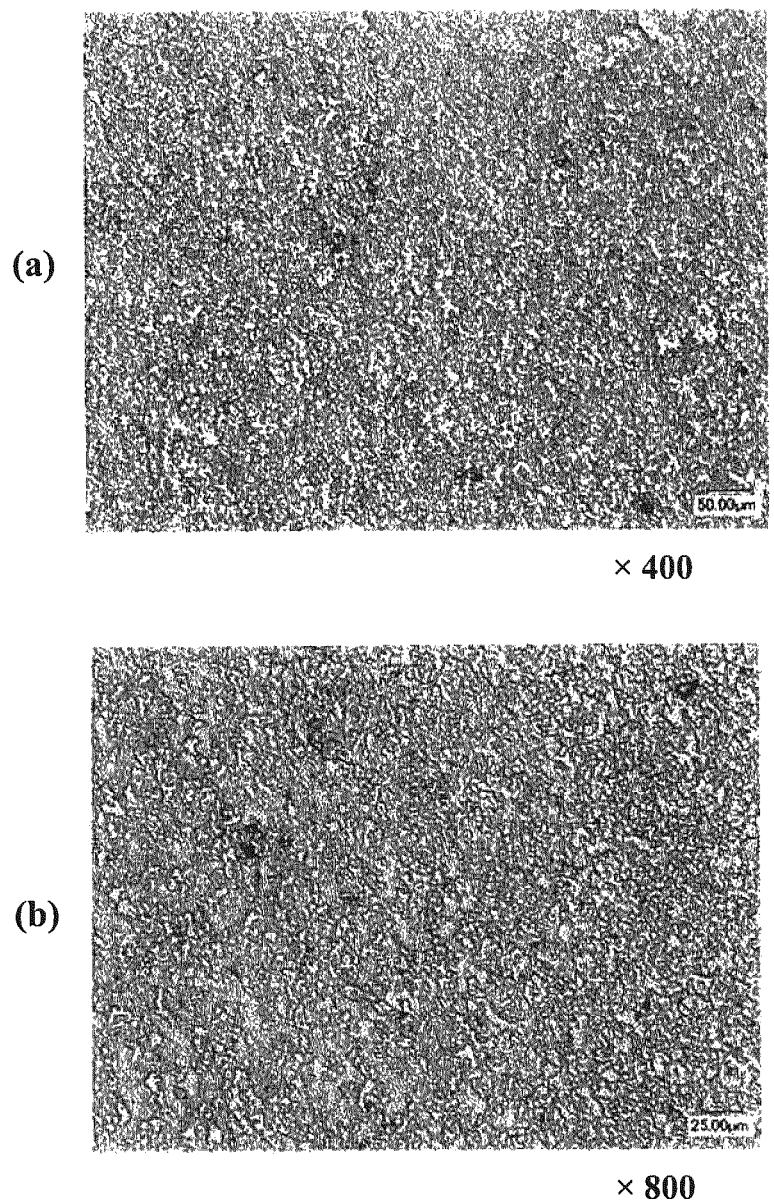
FIG. 4(a) is a cross-section micrograph of an electrode material of Example 1 (at a magnification of ×400)
FIG. 4(b) is a cross-section micrograph of the electrode material of Example 1 (at a magnification of ×800).

A cross section of the electrode material of Example 1 was observed by an electron microscope. FIGS. 4(a) and 4(b) are photomicrographs of the cross section of the electrode material.

In FIGS. 4(a) and 4(b), relatively whitish part (white part) corresponds to alloy textures where Mo and Cr have been formed into a solid solution; and relatively dark part (gray part) correspond to Cu textures. In the electrode material of Example 1, fine alloy textures (white part) of 1 to 10 μm were uniformly micronized and dispersed; and Cu textures were also uniformly dispersed without any uneven distribution.

[Average Particle Size of MoCr Particles in Electrode Material]

Figure 5:
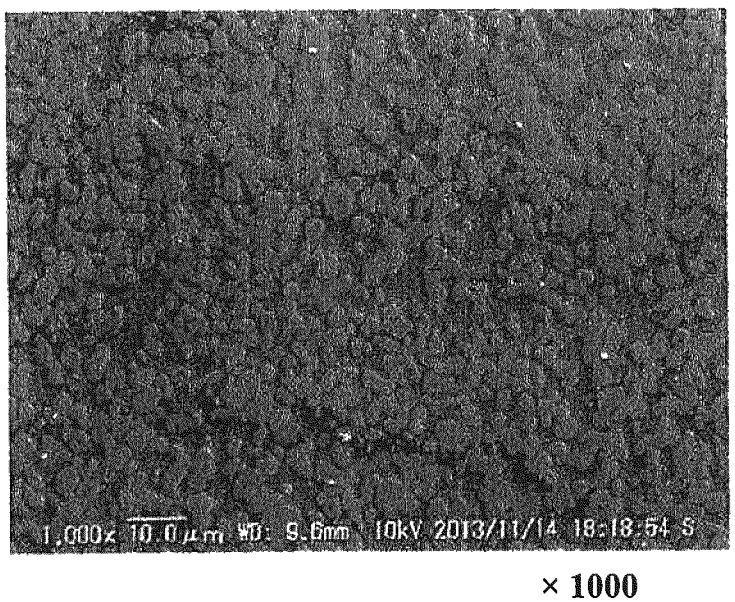
FIG. 5(a) is a SEM cross-sectional photograph (scanning electron microphotograph) of the electrode material of Example 1 (at a magnification of ×1000)
FIG. 5(b) is a SEM cross-sectional photograph of the electrode material of Example 1 (at a magnification of ×2000).
Figure 5:
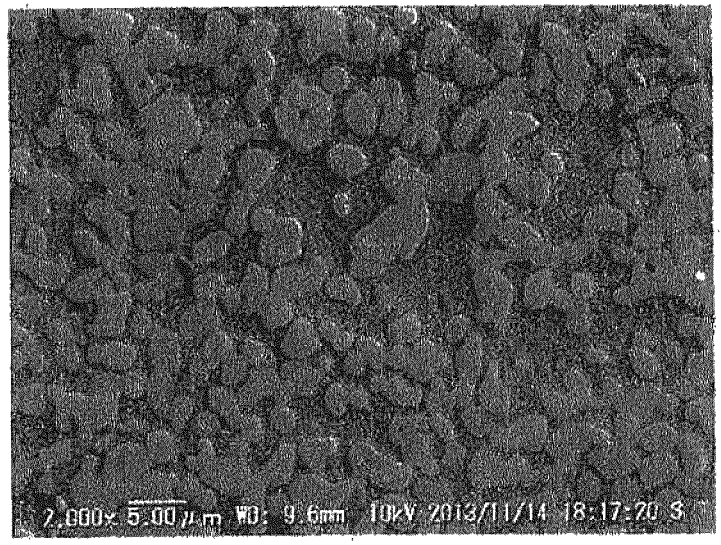

A cross-sectional structure of the electrode material of Example 1 was observed by a SEM (a scanning electron microscope). FIGS. 5(a) and 5(b) are SEM images of the electrode material.

From the SEM images of FIGS. 5(a) and 5(b), the average particle size of the MoCr solid solution alloy textures (white part) was calculated. Herein, the average particle size dm of the MoCr particles of the electrode material was determined according to the following Fullman's equation as disclosed in International Publication No. WO2012/153858.

$$dm=(4/\pi)\times(N_L/N_S) \quad (1)$$

$$N_L=n_L/L \quad (2)$$

$$N_S=n_S/S \quad (3)$$

Herein, the definitions of the respective parameters are as follows: dm is the average particle size; $\pi$ is the ratio of the circumference of a circle to its diameter; $N_L$ is the number of particles per unit length, which are intersected by an arbitrary straight line on the cross-sectional structure; $N_S$ is the number of particles per unit area, which are included in an arbitrary measurement range; $n_L$ is the number of particles intersected by the arbitrary straight line on the cross-sectional structure; L is the length of the arbitrary straight line on the cross-sectional structure; ns is the number of particles included in the arbitrary measurement range; and S is the area of the arbitrary measurement range.

First, the number ns of MoCr particles in the SEM image of FIG. 5(a) was counted assuming the whole of the image as a measurement range (area S). Assuming an arbitrary straight line (length L) as dividing the SEM image into equal parts, the number $n_L$ of particles intersected by the straight line was counted.

These values $n_L$ and $n_S$ were divided by L and S to determine $N_L$ and $N_S$, respectively. The average particle size was then calculated by substituting $N_L$ and $N_S$ into the equation (1).

By the above calculation, the average particle size dm of the MoCr particles of the electrode material of Example 1 was determined to be 3.8 μm. As mentioned above, the average particle size of the MoCr powder obtained by subjecting the mixed powder to provisional sintering at 1250° C. for 3 hours and pulverizing the provisional sintered body by a planetary ball mill was 15.7 μm. In view of the above fact that the average particle size dm of the MoCr powder was determined to be 3.8 μm according to the Fullman's equation by the cross-sectional observation of the MoCr powder after the Cu infiltration, it is considered that the micronization of the MoCr particles further proceeded during the Cu infiltration step S6. It can be said that, as the MoCr powder was obtained in the pulverization step S3 by selection of the pulverization conditions that the median diameter d50 became 30 μm or smaller, the MoCr powder had an average particle size of 15 μm or smaller as determined according to the Fullman's equation by the cross-sectional observation after the Cu infiltration.

[Dispersion State of MoCr Particles in Electrode Material]

The properties of the electrode material depend on not only the number and approximate size of MoCr particles present in the electrode material but also the degree of uniform dispersion of the MoCr particles.

The dispersion state index of the MoCr particles in the electrode material of Example 1 was hence calculated from the SEM images of FIGS. 5(a) and 5(b) for evaluation of the micro-dispersion state of the electrode textures. Herein, the dispersion state index was determined by the following method as disclosed in Japanese Laid-Open Patent Publication No. H04-074924.

First, a distance X between the mass centers of the MoCr particles was measured at one hundred different locations in the SEM image of FIG. 5(b). Then, an average ave.X and standard deviation σ of all of the measured center-to-center distance values X were calculated. The dispersion state index CV was determined by substituting the calculated values ave.X and σ into the following equation (4).

$$CV=\sigma/ave.X \quad (4)$$

By the above calculation, the average ave.X of the center-to-center distance values X was determined to be 5.25 μm; and the standard deviation σ of the center-to-center distance values X was 3.0 μm. Consequently, the dispersion state index CV was 0.57.

[Examples 2-8]

Electrode materials of Examples 2 to 7 were each produced by changing the mixing rate of Mo and Cr powders. More specifically, the electrode materials of Examples 2 to 7 were produced in the same manner as in Example 1, except that the Mo powder and the Cr powder were mixed at a weight ratio of Mo:Cr=9:1, 5:1, 3:1, 1:1, 1:3 and 1:4, respectively. Further, an electrode material of Example 8 was produced in the same manner as in Example 7, except that a Mo powder of different particle size was used. In each of the electrode materials, fine MoCr alloy textures of 1 to 10 μm were uniformly micronized; and Cu textures sere also uniformly dispersed without uneven distribution. The details of these electrode materials can be understood by reference to the description of Japanese Patent Application No. 2015-528797.

Figure 6:
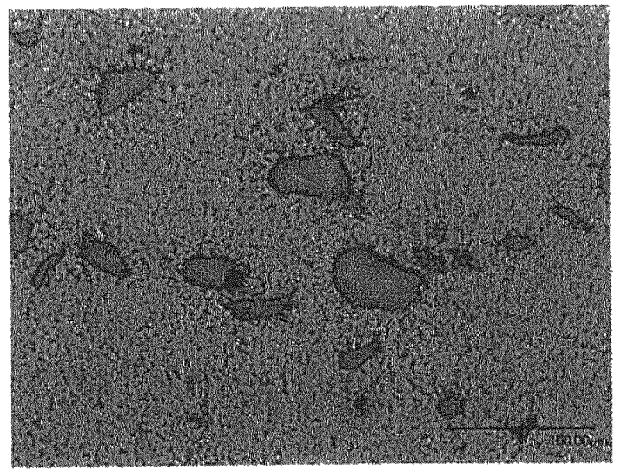
FIG. 6 is a cross-section micrograph of an electrode material of Comparative Example A (at a magnification of ×800).

TABLE 1 shows the production conditions and withstand voltage performance test results of the electrode materials of Examples 1 to 8. Herein, the withstand voltage performance of each electrode material is indicated as a relative value assuming the withstand voltage performance of an electrode material of Comparative Example B as 1. Electrode materials of Reference Examples 1 and 2 were produced by performing the provisional sintering step S2 under different sintering conditions from those of Example 1. Electrode materials of Comparative Examples A and B correspond to conventional electrode materials each produced by press molding a mixed powder of Mo and Cr powders with a pressure of 2 t/cm², sintering the resulting molded body at 1200° C. for 2 hours and then infiltrating the sintered body with Cu (at 1150° C. for 2 hours). As shown in FIG. 6, the electrode material of Comparative Example A had a composition where Cu textures of 20 to 60 μm (black part) were dispersed in fine MoCr solid solution particles of 1 to 10 μm (white part). This is assumed to be the result of infiltration of Cu into pores generated during the process in which the Cr particles were micronized by the Mo particles and diffused in the Mo particles by their diffusion mechanism for the formation of the CrMo solid solution.

TABLE 1

| | Mo:Cr mixing ratio | Mo particle size (μm) | Cr particle size | Sintering conditions | Peak disappearance | Press pressure (ton/cm²) | Withstand voltage (relative value) |
|---|---|---|---|---|---|---|---|
| Ex. 1 | 7:1 | 2.8-3.7 | −325 mesh | 1250° C. 3 h | ○ | 2 | 1.22 |
| Ex. 2 | 9:1 | 2.8-3.7 | −325 mesh | 1250° C. 3 h | ○ | 2 | 1.20 |
| Ex. 3 | 5:1 | 2.8-3.7 | −325 mesh | 1250° C. 3 h | ○ | 2 | 1.20 |
| Ex. 4 | 3:1 | 2.8-3.7 | −325 mesh | 1250° C. 3 h | ○ | 2 | 1.15 |
| Ex. 5 | 1:1 | 2.8-3.7 | −325 mesh | 1250° C. 3 h | ○ | 2 | 1.15 |
| Ex. 6 | 1:3 | 2.8-3.7 | −325 mesh | 1250° C. 3 h | Δ | 2 | 1.13 |
| Ex. 7 | 1:4 | 2.8-3.7 | −325 mesh | 1250° C. 3 h | Δ | 2 | 1.13 |
| Ex. 8 | 1:4 | ≥4.0 | −325 mesh | 1250° C. 3 h | Δ | 2 | 1.17 |
| Ref. Ex. 1 | 7:1 | 2.8-3.7 | −325 mesh | 1200° C. 0.5 h | X | 2 | 1.02 |
| Ref. Ex. 2 | 7:1 | 2.8-3.7 | −325 mesh | 1200° C. 3 h | X | 2 | 1.04 |
| Com. Ex. A | 7:1 | 2.8-3.7 | −180 mesh | none | X | 2 | 1.04 |
| Com. Ex. B | 7:1 | 2.8-3.7 | −325 mesh | none | X | 2 | 1.00 |

It has been shown by the results of Examples 1 to 8 in TABLE 1 that the electrode materials of Examples 1 to 8 had higher withstand voltage performance than those of Comparative Examples A and B. It has also been shown that the withstand voltage performance was improved with increase in the content ratio of the heat resistant element in the electrode material. Accordingly, the alloy compositions of the electrode materials of Examples 1 to 8 were each controlled to not only allow micronization and uniform dispersion of the particles where the heat resistant element and Cr were mutually dissolved and diffused, but also allow fine and uniform dispersion of the Cu textures as the high conductive component, through the following steps: the mixing step of mixing the heat resistant element powder and the Cr powder; the provisional sintering step of subjecting the mixed of the heat resistant element powder and Cr powder to provisional sintering; the pulverization step of pulverizing the provisional sintered body; the main sintering step of subjecting the pulverized powder to main sintering; and the Cu infiltration step of infiltrating the main sintered body (skeleton) with Cu.

[Evaluation of Dielectric Recovery Characteristics]

Figure 7:
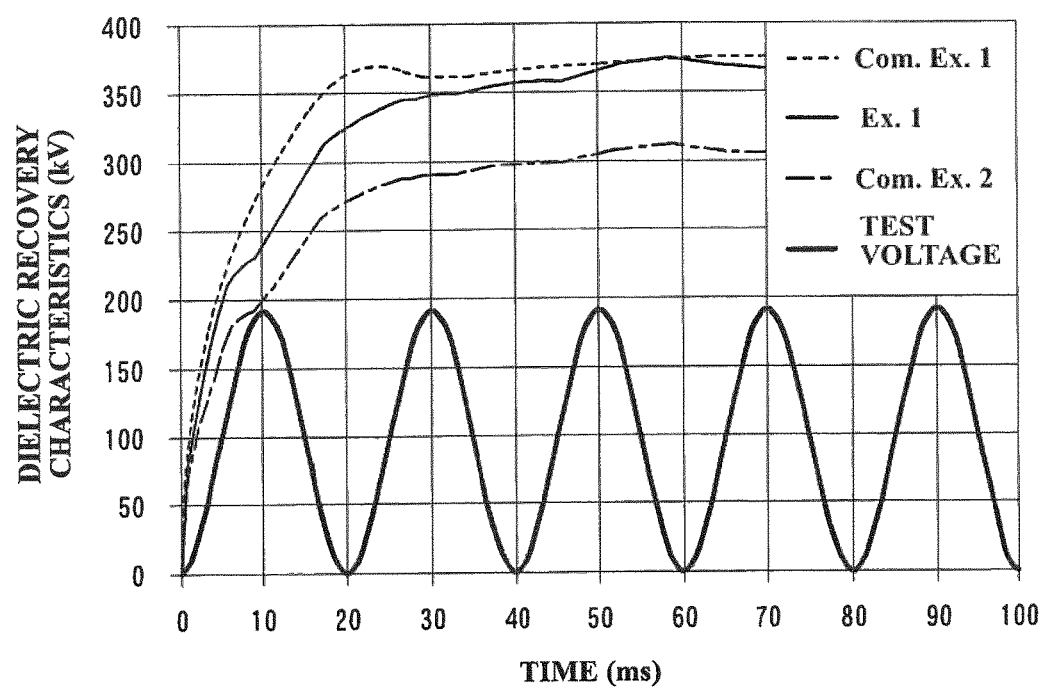
FIG. 7 is a characteristic diagram showing dielectric recovery characteristics of the vacuum circuit breaker according to one embodiment of the present invention.

Using the electrode material of Example 1 as a material of electrode contacts (fixed and movable electrodes), a vacuum interrupter was manufactured (hereinafter referred to as "vacuum interrupter of Example 1"). The thus-produced vacuum interrupter was tested for the dielectric recovery characteristics. TABLE 2 shows the electrode and operation conditions. FIG. 7 shows the dielectric recovery characteristics of the vacuum interrupters of Example 1 and Comparative Examples 1 and 2.

The vacuum interrupter of Comparative Example 1 was a conventional vacuum interrupter provided with fixed and movable electrodes of CuCr electrode material and having an interruption speed of 3.0 m/s and a gap length of 60 mm during interruption. The CuCr electrode material was produced by using the same material (Cu powder) as that of the electrode material of Example 1 and, more specifically, by sintering the Cr powder and then infiltrating the sintered body with Cu. The vacuum interrupter of Comparative Example 2 was a vacuum interrupter provided with electrodes of the same material as that of the vacuum interrupter of Comparative Example 1 and having the same interruption speed and gap length as those of the vacuum interrupter of Example 1.

TABLE 2

| | | Operation conditions | |
|---|---|---|---|
| Type | Electrode conditions Material | Interruption speed (m/s) | Gap length (mm) during interruption |
| Comp. Ex. 1 | CuCr | 3.0 | 60 |
| Ex. 1 | CuCr + heat resistant element | 1.5 | 40 |
| Comp. Ex. 2 | CuCr | 1.5 | 40 |

As shown in FIG. 7, the vacuum interrupter of Example 1 had the same level of dielectric recovery characteristics as the vacuum interrupter of Comparative Example 1. Even though the vacuum interrupter of Example 1 was reduced in interruption speed by 50% and in interruption gap length by 33% relative to the vacuum interrupter of Comparative Example 1 as shown in TABLE 2, the dielectric recovery characteristics of the vacuum interrupter of Example 1 were at the same level as those of the conventional vacuum interrupter. As is seen from comparison between the vacuum interrupter of Comparative Example 1 and the vacuum interrupter of Comparative Example 2, on the other hand, the dielectric recovery characteristics of the vacuum interrupter were deteriorated when the vacuum interrupter was manufactured with a reduced interruption speed and interruption gap length by using the CuCr electrode material as the electrode contact. Vacuum interrupters, when manufactured with a reduced interruption speed and interruption gap length by using the electrode materials of Examples 2 to 8 as in the case of using the electrode material of Example 1, also had the same level of dielectric recovery characteristics as the conventional vacuum interrupter.

As described above, it is possible in the present embodiment to improve the dielectric recovery characteristics of the vacuum circuit breaker during interruption and reduce the interruption speed and interruption gap length of the vacuum circuit breaker by improving the withstand voltage performance of the electrode material. This enables a decrease in the operation force of the vacuum circuit breaker as well as an improvement in the reliability of the vacuum circuit breaker by downsizing of stroke mechanism, downsizing of equipment and reduction of parts count.

As the gas between the fixed electrode (or movable electrode) and the main shield can be shortened, it is possible to decrease the structure of the vacuum interrupter and thereby possible to achieve downsizing of the vacuum interrupter and the vacuum circuit breaker and manufacturing cost reduction of the vacuum circuit breaker.

In other words, the vacuum circuit breaker according to the present embodiment becomes able to reduce its interruption speed or interruption gap length by improvement of the withstand voltage performance of the electrode material.

The electrode material used in the vacuum circuit breaker according to the present embodiment has a composition where the fine particles formed by mutual dissolution and diffusion of the heat resistant element and Cr (i.e. solid solution particles of the heat resistant element and Cr) are uniformly dispersed. The average particle size of the fine particles is varied depending on the average particles sizes of the Mo and Cr powders as raw materials. The current interruption performance and withstand voltage performance of the electrode material is improved by controlling the average particle size of the fine particles dispersed in the electrode material to be 20 µm or smaller, preferably 15 µm or smaller, as determined according to the Fullman's equation.

By comparison between the particle size of the MoCr powder measured after the provisional sintering and pulverization steps and the average particle size of the MoCr particles of the electrode material determined according to the Fullman's equation after the Cu filtration step, it has been confirmed that the micronization of the MoCr particles further proceeds during the Cu filtration step. In the above-mentioned specific example, the particle size of the MoCr powder after the pulverization step was d50=30 µm; whereas the average particle size of the MoCr particles of the electrode material was 10 µm or smaller as determined according to the Fullman's equation after the Cu infiltration step. As is evident from this result, it is feasible to obtain the electrode material with high withstand voltage performance and current interruption performance by controlling the volume-based relative particle amount of particles of 30 µm or smaller size in the MoCr powder to be 50% or more. Since the solid solution particles of the heat resistant element and Cr are further micronized during the Cu infiltration step, the electrode material can attain high withstand voltage performance and current interruption performance even in the case where there remains a slight Cr element peak in the XRD measurement of the solid solution powder of the heat resistant element and Cr as in the electrode materials of Examples 6 to 8.

Further, the current interruption performance and withstand voltage performance of the electrode material is improved by controlling the dispersion state index of the fine particles where the heat resistant element and Cr are mutually diffused (i.e. particles of the solid solution of the heat resistant element and Cr), which can be determined from the average and standard deviation of the distance values between the mass centers of the fine particles, to be 2.0 or lower, preferably 1.0 or lower.

The withstand voltage performance and current interruption performance of the electrode material can be improved with increase in the content of the heat resistant element in the electrode material. When only the heat resistant element is contained in the electrode material (that is, Cr is not contained in the electrode material), however, it may become difficult to infiltrate Cu into the electrode material. Thus, the ratio of the heat resistant element and the Cr element in the solid solution powder is preferably controlled such that Cr is contained at a weight ratio of 4 or less, more preferably ⅓ or less, per 1 weight of the heat resistant element. In this composition range, it is feasible to effectively improve the withstand voltage performance of the electrode material.

By infiltrating the MoCr sintered body with Cu after performing HIP treatment on the MoCr sintered body, the content of the heat resistant element in the electrode material can be further increased to improve the withstand voltage performance of the electrode material.

The average particle size of the heat resistant element (such as Mo) can be a factor for determining the particle size of the solid solution powder of the heat resistant element and Cr. The solid solution of the heat resistant element and Cr is formed as the Cr particles are micronized by the heat resistant element particles and diffused in the heat resistant elements by their diffusion mechanism. The particle size of the heat resistant element particles is increased by the provisional sintering. The degree of increase of the particle size of the heat resistant element particles by the provisional sintering is varied depending on the mixing ratio of Cr. The average particle size of the heat resistant element powder is thus preferably controlled to 2 to 20 µm, more preferably 2 to 10 µm. By such particle size control, it is feasible to obtain the solid solution powder of the heat resistant element and Cr for the production of the electrode material with high withstand voltage performance and current interruption performance.

The electrode material produced upon the infiltration attains a filling rate of 95% or higher and shows less surface roughening due to arc caused at current interruption or current switching. Namely, the withstand voltage performance of the electrode material can be improved with no minute projections and depressions generated on the surface of the electrode material due to the presence of pores. The mechanical strength of the electrode material can also be improved by infiltration of Cu into the pores of the electrode material so that the electrode material becomes high in hardness, as compared to an electrode material produced by a sintering method, and thereby obtains an improvement in withstand voltage performance.

It is possible to improve the withstand voltage performance of the electrode material by controlling the composition of the electrode material so as to achieve micronization and uniform dispersion of the particles where the heat resistant element and Cr are mutually dissolved and diffused as well as fine and uniform dispersion of the Cu textures as the highly conductive component.

Although the present invention has been described with reference to the above specific preferable embodiment, it should be understood that: the present invention is not limited to the above specific embodiment; various changes and modifications of the embodiment are possible within the range does not impair the features of the present invention; and these changes and modifications are fairly included in the scope of the present invention.

For example, the provisional sintering is performed under the conditions of a sintering temperature of 1250° C. and a sintering time of 3 hours in the above embodiment. In the present invention, however, the provisional sintering temperature is set higher than or equal to 1250° C. or lower than or equal to the melting point of Cr, preferably 1250° C. to 1500° C. In such a provisional sintering temperature range, it is possible to ensure sufficient mutual diffusion of Mo and Cr, relatively easily pulverize the resulting MoCr solid solution by a pulverizer and produce the electrode material with high withstand voltage performance and current interruption performance. The provisional sintering time is varied depending on the provisional sintering temperature. In the above embodiment, the provisional sintering is performed at 1250° C. for 3 hours. In the case where the provisional sintering temperature is 1500° C., it is enough to perform the provisional sintering for 0.5 hour.

The MoCr solid solution powder is not limited to that produced by the production method of the above embodiment, and can alternatively be produced by any known production method (such as jet milling, atomization etc.).

The production method of the electrode material used in the vacuum circuit breaker according to the present invention is not limited to that of the above embodiment as long as: fine particles where the heat resistant element and Cr are mutually diffused (i.e. particles of the solid solution of the heat resistant element and Cr) are uniformly dispersed; and these fine particles has an average particle size of 20 μm or smaller (preferably 15 μm or smaller) as determined according to the Fullman's equation and a dispersion state index of 2.0 or lower (preferably 1.0 or lower) as determined from the average and standard deviation of the distance values between the mass centers of the fine particles. For example, the electrode material may be produced by a dissolution method of dissolving Cu and Cr etc. at a predetermined composition ratio.

Although the above embodiment specifically refers to the vacuum circuit breaker in which the vacuum interrupter is accommodated in the ground tank, the vacuum interrupter may be mounted to a box-type or tubular-type gas insulated switch gear (GIS). The electrode (contact) of the vacuum interrupter is applicable to not only a vacuum circuit breaker (VCB) with a phase Modifier switching function and an interruption current switching function, but also a vacuum switch (VS) with only a phase modifier switching function and any uses other than for phase modification purposes.

The invention claimed is:

1. A vacuum circuit breaker comprising a vacuum interrupter accommodated in a casing filled with insulating gas, the vacuum interrupter comprising:
   a vacuum container having an insulating tube and seal members for sealing both ends of the insulating tube; and
   a pair of contacts arranged in the vacuum container and configured to be contactable with or separable away from each other, and being fixed to conductive shaft members,
   wherein at least one of the contacts comprises an electrode material containing a Cu phase and a phase of solid solution particles uniformly dispersed in the Cu phase, the solid solution particles comprising a solid solution of Cr and a heat resistant element selected from Mo, W, Ta, Nb, V, and Zr;
   wherein the electrode material comprises 20 to 70% by weight of Cu, 1.5 to 64% by weight of Cr, and 6 to 76% by weight of the heat resistant element, relative to a weight of the electrode material, with the balance being unavoidable impurities; and
   wherein the solid solution particles contained in the electrode material have an average particle size of 20 μm or smaller, and are uniformly dispersed in the Cu phase with a dispersion state index of 1.0 or lower.

2. The vacuum circuit breaker of claim 1, wherein the electrode material comprises 4 to 15% by weight of Cr.

3. The vacuum circuit breaker of claim 1, wherein the electrode material comprises 25 to 60% by weight of Cu.

4. The vacuum circuit breaker of claim 1, wherein the electrode material comprises 32 to 68% by weight of the heat resistant element.

5. The vacuum circuit breaker of claim 1, wherein the heat resistant element is Mo.

* * * * *